US008225961B2

(12) United States Patent
Anson

(10) Patent No.: US 8,225,961 B2
(45) Date of Patent: Jul. 24, 2012

(54) MULTIPLE HOT WATER DISPENSING SYSTEM

(75) Inventor: James H. Anson, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 576 days.

(21) Appl. No.: 11/209,376

(22) Filed: Aug. 23, 2005

(65) Prior Publication Data
US 2006/0042470 A1 Mar. 2, 2006

Related U.S. Application Data

(60) Provisional application No. 60/604,627, filed on Aug. 25, 2004.

(51) Int. Cl.
*B67D 1/00* (2006.01)
(52) U.S. Cl. ......... 222/54; 222/14; 222/146.2; 236/12.1
(58) Field of Classification Search ............... 222/14, 222/40, 54, 55, 146.2, 146.5; 236/12.1, 12.11, 236/12.12
See application file for complete search history.

(56) References Cited

U.S. PATENT DOCUMENTS

| 2,983,487 | A | * | 5/1961 | MacKay | 165/236 |
|---|---|---|---|---|---|
| 5,038,752 | A | | 8/1991 | Anson | |
| 5,584,229 | A | | 12/1996 | Anson | |
| 5,975,365 | A | * | 11/1999 | Hsieh | 222/129.4 |
| 6,164,189 | A | | 12/2000 | Anson | |
| 6,250,558 | B1 | * | 6/2001 | Dogre Cuevas | 236/12.12 |
| 6,286,764 | B1 | * | 9/2001 | Garvey et al. | 236/12.12 |
| 6,290,139 | B1 | * | 9/2001 | Kolze | 236/12.11 |
| 2002/0179723 | A1 | * | 12/2002 | Wack et al. | 236/12.16 |
| 2003/0080194 | A1 | * | 5/2003 | O'Hara et al. | 236/12.12 |

* cited by examiner

*Primary Examiner* — J. Casimer Jacyna
(74) *Attorney, Agent, or Firm* — Barnes & Thornburg LLP

(57) ABSTRACT

An apparatus, system and method for dispensing water at a variety of temperatures and volumes. The apparatus includes at least two tanks having different temperatures, controlled by a controller. A calculated volume of water from tanks having different water temperatures, is dispensed to provide a desired temperature and volume of water. Flow from the tanks is controlled by valves receiving signals from the controller.

9 Claims, 2 Drawing Sheets

MULTIPLE HOT WATER DISPENSING SYSTEM

CROSS-REFERENCE TO RELATED PATENT APPLICATION

This patent application claims the benefit of U.S. Provisional Patent Application No. 60/604,627, filed Aug. 25, 2004. The disclosure set forth in the referenced provisional application is incorporated herein by reference in its entirety, including all information as originally submitted to the U.S. Patent and Trademark Office.

BACKGROUND

It is desirable in restaurants and other institutional cooking establishments to have a source of hot water for various cooking purposes. For example, hot water is necessary in the preparation of soups, pastas, gravies, pizza dough and other dishes. Additionally, a source of hot water is desirable in the preparation of hot chocolate, tea, coffee, and other hot or brewed beverages. Moreover, a source of hot water is desirable for various cleaning purposes.

Having a range of temperatures of hot water readily available is desired by many restaurants because the various food products prepared at such restaurants may require different hot water temperatures for their preparation. Conventional hot water dispensers may have disadvantages. In particular, it may be inconvenient and impractical to have to modify the dispenser whenever a water dispensing temperature outside the current operating range of the dispenser is needed. Unfortunately, in a restaurant or other cooking environment, the need to modify the machine arises frequently because of the different water temperatures necessary to produce different types of food. Another drawback may be the inability of existing dispensers to produce water of a desired temperature quickly. Such delay can be disadvantageous in a restaurant or other cooking environment in which efficient service is important. A further drawback is wastage of hot water, because of user-related error in dispensing; i.e., users of the machine often dispense too much water from the machine. Users can also dispense water of the incorrect temperature unwittingly, which degrades the quality of the food or beverage being prepared. Thus there is a need for a machine that can dispense a selection of pre-selected volumes of water at a variety of pre-selected temperatures.

Briefly, in accordance with the foregoing, disclosed are an apparatus, system, and method for dispensing hot water at a variety of volumes and at a variety of temperatures. Although water is used throughout this disclosure, the present apparatus, system, and method may be used with any fluid. The apparatus includes at least two tanks, a hot water tank containing water a generally steady temperature that is higher than or equal to a pre-selected dispensing temperature and at least one other tank containing water that has a generally steady temperature that is lower than or equal to the pre-selected dispensing temperature. Flow from the respective tanks is controlled by outlet valves associated with a controller. A calculated volume of water is controllably dispensed from each tank into a common dispensing passage or mixing area. A temperature sensor coupled with the controller and associated with the common dispensing passage detects the mixed water temperature prior to dispensing. The controller receives a signal from the sensor for providing feedback about the water temperature. The mixed water is then dispensed into a container which may be weighed by an associated scale to determine the volume of water dispensed. A flow sensor coupled to the controller may be used in place of or in addition to the scale to determine the volume of water dispensed.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

Figure 1:
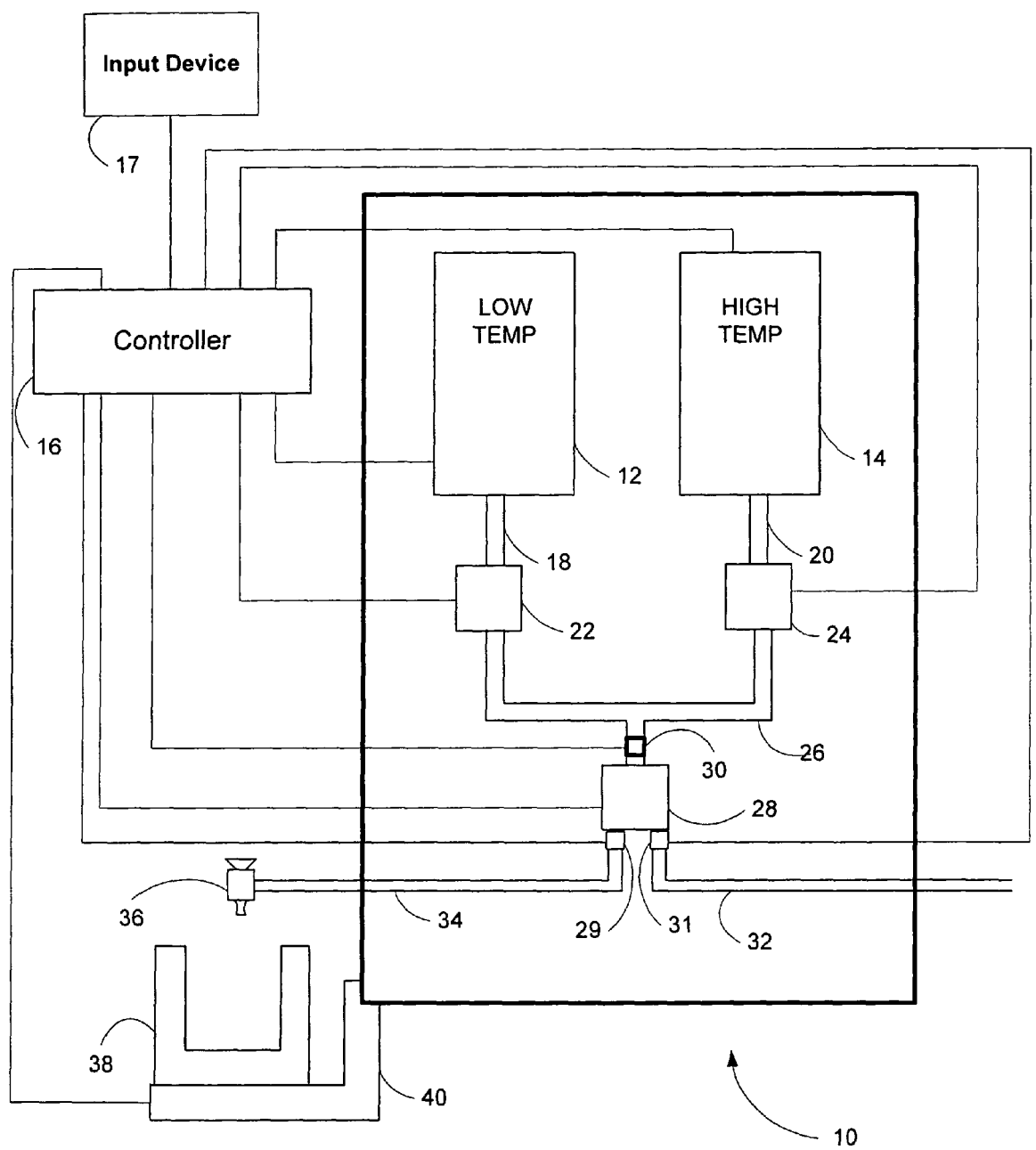
FIG. 1 is a simplified diagram of an apparatus for dispensing a variety of water temperatures and volumes of hot water.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

The present disclosure provides an apparatus, system, and method for dispensing hot water at a variety of temperatures and volumes. The apparatus may be used in connection with a variety of beverage making machines used to brew a variety of beverages. Terms including beverage, brewed, brewing, and brewed beverage as may be used herein are intended to be broadly defined as including, but not limited to, the brewing of coffee, tea and any other beverage. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

As shown in FIG. 1, an apparatus 10 for dispensing water at a variety or range of temperatures and volumes. Apparatus 10 includes a generally lower temperature tank, a first temperature water source 12 and a generally higher temperature tan, a second temperature water source 14. Water from the first temperature water source 12, and the second temperature water source 14 is combined to produce water at a final desired temperature for dispensing, referred to herein as a Dispense Temperature. The temperature of the water held in low temperature tank, the first temperature water source 12 is generally less than or equal to the Dispense Temperature. The temperature of the water held in high temperature tank, the second temperature water source 14, is generally greater than or equal to the Dispense Temperature. Apparatus 10 also includes a controller 16 which senses and controllably operates other components of apparatus 10 as described below.

The Dispense Temperature and a desired dispense volume may be entered into the system using an input device 17 associated with controller 16. Input device 17 may be a keypad, keyboard, control panel, button selection, voice response system, or other input interface. Input device 17 may also be used to enter a desired dispense volume, such as for example, a cup, quart, gallon, liter, or other volume quantity. Input device 17 may also recall stored values associated with a selected beverage or food recipe.

Low and high temperature tanks, water sources 12, 14, are associated with low and high temperature outlet tubes, first outlet tube 18, second outlet tube 20, which are selectively sealed by low and high temperature valves, first valve 22 and second valve 24. Low and high temperature valves, first valve 22 and second valve 24 are in communication with and controllably operated by controller 16. Any suitable valve may be used including by way of example, but not limitation, a butterfly valve or solenoid valve. Water may be released from either or both water sources 12, 14 via the respective outlet tube 18, 20 into a common passage 26 where water is mixed. Further release through apparatus 10 is controlled by mixing valve 28 which is controllably operated by controller 16. Mixing valve 28 may be a single valve that selectively shuts off or permits flow to one of multiple outlets or may take the form of two valves, dispense valve 29, drain valve 31 which are coupled to and controllably operated by controller 16 to allow flow to only a desired outlet. Temperature sensor 30 is associated with the common passage 26 in a position to sense the water's temperature in the common passage 26.

Mixing valve 28 may be operated by controller 16 to selectively permit flow to dispensing tube 34 or drain tube 32. Water flowing through drain tube 32 can be directed to any other application, including being recycled, disposed or otherwise used or not used. Water that is directed through the dispensing tube 34 may be further directed out a dispensing device 36, shown in FIG. 1 as a faucet.

Water may then be directed to a container 38, such a tank, carafe, cup, pitcher, bowl, or any other type of container or be directed directly into another portion of food or beverage making equipment for use in a particular food or beverage making application. Container 38 may be weighed by a scale 40 that is in communication with controller 16.

In use, a user inputs a desired Dispense Temperature and a desired dispense volume combination into the controller 16 using input device 17, or a Dispense Temperature, volume combination may be recalled. Water sources 12, 14 may be filled with water that is generally maintained at a consistent temperature. Both water sources, 12, 14 are held respectively at generally consistent temperatures, which are generally referred to herein as first and second known temperatures, to help make the mixing temperature consistent and predictable. Any structure or method may be used to deliver water to tanks or water sources 12, 14 including pouring in such water or delivering water from a water source via an inlet tube. Any suitable method may be used to maintain the volumes of water in the tanks or water sources 12, 14 at their respective selected temperatures. One method that may be used, explained here as a non-limiting example, is using a temperature sensor associated with a particular tank to sense the temperature, and, where the temperature has fallen below a desired temperature, activating a heating element to heat the water to the desired temperature.

Controller 16 is programmable to perform calculations using the temperatures of the volumes of water in the low and high temperature water sources 12, 14 to determine the volume that needs to be dispensed from each tank, referred to herein generally as a first and second volumes, to deliver a desired mixed volume at the desired temperature. By way of example, but not limitation, the hot temperature tank's water temperature may be maintained at 212° F. and low temperature tank's water temperature may be maintained at 50° F. The user may, for the user's particular application, require 1 gallon (128 oz.) of water at 72° F. Controller 16 calculates the volume of water from each tank 12, 14.

An example calculation is as follows: Equation 1: $(X)(212° F.)+(Y)(50° F.)=128(72° F.)$, where X and Y represent the volume in ounces needed from high temperature tank 14, and low temperature tank 12, respectively. Equation 2: $X+Y=128$ Solving the Equation 1 and Equation 2 system yields $X=17.38$ oz and $Y=110.62$ oz. Controller 16 may initially controllably operate first and second valves 22, 24 to dispense volumes X and Y from tanks or water sources 14, 12 respectively. Any suitable method of measuring a dispensed volume may used, such as, for example, determining a flow rate and multiplying that rate by a time sufficient to dispense the desired volume (oz./sec.×sec.=oz). Another method may use some form of flow meter for measuring the volume of the water being dispensed. Yet another method may include weight measuring sensors for each tank for monitoring the weight of the tank and determining the volume dispensed by monitoring the weight decrease. Other methods may be used to control dispensing as well. The two volumes of water mix in common passage 26 to form one mixed volume. Temperature sensor 30 senses the temperature of the mixed volume to verify the mixed volume temperature is at the Dispense Temperature, in this example, at 72° F. If the mixed volume temperature is not correct, controller 16 may operate first and second valves 22, 24 to dispense more high or low temperature water to achieve the desired temperature. Temperature variation may be caused by a variety of factors including, but not limited to, heat loss as the water travels down low and high temperature outlet tubes, first outlet tube 18 and second outlet tube 20, or water temperature variation at different levels in water sources 12, 14 not identified by the temperature maintenance mechanisms associated with water sources 12, 14. While adjustments are being made, mixing valve 28 may be controllably operated to allow excess water to drain out drain tube 32.

When the mixed volume has reached the Dispense Temperature, mixing valve 28 closes drain tube 32. Mixing valve 28 opens dispensing tube 34 until 1 gallon has been dispensed. The dispensed volume can be controlled using any of the methods described above for measuring the volume released from water sources 12, 14 or can also be based on weighing the container 38 using scale 40. A calculation can be performed to determine the weight of the desired volume of water. Continuing the example above, water has a density of 0.0361 lbs. per cubic inch. One gallon of water is 231 cubic inches of water, so $231\ \text{in}^3 \times (0.0361\ \text{lbs/in}^3)=8.342$ lbs. Mixing valve 28 would stop dispensing water when the weight of container 38 is 8.342 lbs plus the tare weight of container 38.

For applications that only require water ranging from 72° F. to 212° F., water source 12 could be set to a temperature of 72° F. as opposed to 50° F. in the above example. Similarly, any range of water temperatures could be achieved by adjusting the temperatures maintained in water sources 12, 14. Multiple outlets and multiple tank combinations within a single apparatus can also be used to provide multiple ranges of temperatures. The size of the tanks and the multiplicity of outlets could be specified depending on the variety of temperature ranges needed. An example of a potential user of such a multi-range, multi-outlet system is a co-branded restaurant, such as the Taco Bell™/KFC™ restaurants or Burger King™/Pizza Hut™ restaurants which may require different water temperatures to prepare their respective food offerings. Further, in such environments, input device 16 may display a selection for a particular food that requires hot water, such as a button or other selection device marked "Pizza Crust" or "Chicken Batter." Controller 16 may store the correct temperature/volume combination for each selection, so that a user need not know the settings, only the food to be prepared. This is advantageous in fast food environments where the operators of the equipment may not be technically savy and need simple, straightforward interfaces.

Controller 16 may also be in communication with a central server over a communications network, such as the Internet, an intranet, local network, or wide-area network, in either a wired or wireless configuration, using any industry known networking technology. That central server may store the recipe information for various hot water applications. An update to a recipe on the central server can thus be distributed to controller 16, or in a multi-node configuration, to each controller 16 of each apparatus 10 so that instantaneous updating across all apparatuses can be achieved.

Figure 2:
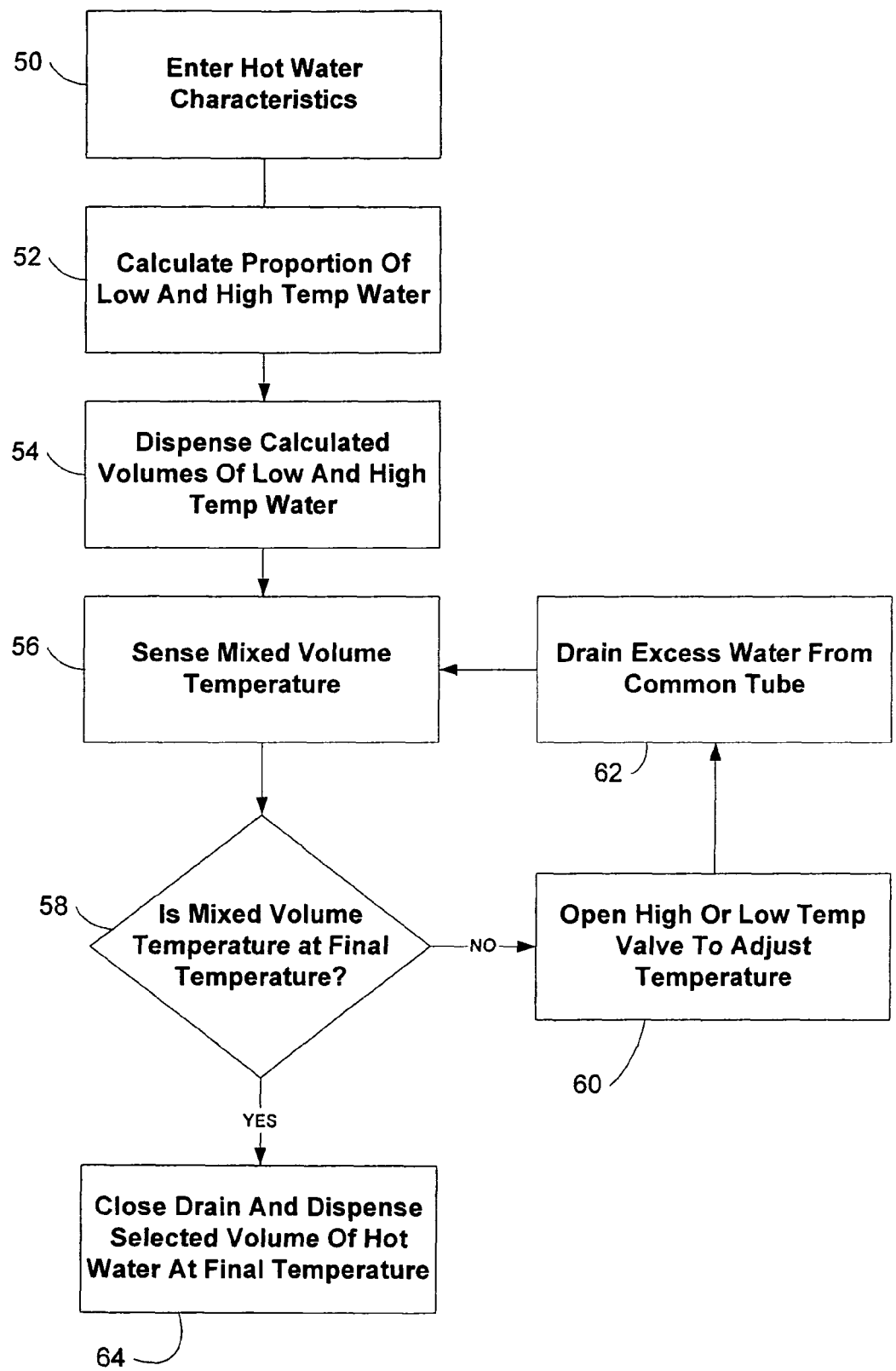
FIG. 2 is a simplified flow diagram of a method of controlled dispensing of a volume of liquid at a desired temperature.

A sequence showing an operation of apparatus 10 is shown in FIG. 2. In a first step 50, the desired hot water characteristics, such as temperature and volume, are entered or recalled such as by using the input device 17 or recalling settings from memory associated with controller 16. In a next step 52, a volume of water from each tank needed to achieve the desired volume at the desired temperature is calculated and in a next step 54 dispensed into common dispensing passage 26 to form a mixed volume. The temperature of mixed volume is sensed in step 56 and compared to the selected Dispense Temperature in step 58. If the mixed volume temperature does not match the Dispense Temperature within acceptable tolerances, the valves 22, 24 are operated to dispense either cooler or hotter water to adjust the mixed volume's temperature (step 60). Excess water building up in common tube 26 may be drained via drain tube 32 (step 62). If the mixed volume temperature matches the Dispense Temperature, drain tube 32 is closed and the selected or recalled volume of water is dispensed to container 38 or to another portion of the beverage making process (step 64).

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the features, elements, steps, or combinations thereof. Further, this application is intended to cover such departures from the present disclosure as come within the known or customary practice within the art to which it pertains.

The invention claimed is:

1. An apparatus for dispensing hot water at at least one user selected volume and at at least one user selected temperature, the apparatus comprising:
   an input device for input of a user selected dispense temperature and a user selected dispense volume of water;
   a controller for controllably operating at least a portion of the apparatus to control the apparatus to dispense water at a user selected dispense temperature and a user selected dispense volume, the controller being coupled to the input device;
   a first controlled temperature water source including a first tank operatively coupled to the controller, a heater for heating water in the first tank, the first controlled temperature water source having a first valve communicating with the first tank for controllable dispensing from the first controlled temperature water source, the first valve communicating with and controlled by the controller in response to the user selected dispense temperature and user selected dispense volume;
   a second controlled temperature water source including a second tank operatively coupled to the controller, a heater for heating water in the second tank, the second controlled temperature water source having a second valve communicating with the second tank for controllable dispensing from the second controlled temperature water source, the second valve communicating with and controlled by the controller in response to the user selected dispense temperature and user selected dispense volume;
   a common passage connected to an outlet of the first valve of the first controlled temperature water source and an outlet of the second valve of the second controlled temperature water source;
   a temperature sensor positioned to sense a temperature of water in the common passage, the temperature sensor coupled to the controller for providing feedback to the controller for controlling the first and second valves to achieve a user selected dispense temperature;
   a mixing valve along the common passage for receiving water flow from each of the outlets of the first and second valves, the mixing valve being in communication with and controlled by the controller for controllably dispensing water from the common passage; and
   a dispensing tube connected to the common passage.

2. The apparatus of claim 1, further comprising the input device being one or more of a keypad, keyboard, control panel, button selection, internet connection, intranet connection, local network, wide-area network, and wireless configuration.

3. The apparatus of claim 1, further comprising a dispense valve in communication with and controlled by the controller, the dispenser valve being positioned along the dispensing tube.

4. The apparatus of claim 1, further comprising a dispensing device coupled to the dispensing tube.

5. The apparatus of claim 1, further comprising a scale in communication with the controller.

6. The apparatus of claim 1, further comprising a drain tube connected to the common passage and a drain valve positioned along the drain tube, the drain valve being in communication with and controlled by the controller.

7. The apparatus of claim 1, further comprising the controller being operative to perform calculations using a first temperature of water in the first controlled temperature water source and a second temperature of water in the second controlled temperature water source to determine a first volume to be dispensed from the first controlled temperature water source and a second volume to be dispensed from the second controlled temperature water source.

8. The apparatus of claim 1, further comprising the controller being in communication with a communications network.

9. An apparatus for dispensing hot water at least one user selected volume and at least one user selected temperature, the apparatus comprising:
   an input device for input of a user selected dispense temperature and a user selected dispense volume of water;
   a controller for controllably operating at least a portion of the apparatus, the controller being coupled to the input device;

a first controlled temperature water source including a first tank operatively coupled to the controller, a heater for heating water in the first tank to at least 200° F., a first outlet tube communicating with the first water source, and a first valve positioned along the first outlet tube, the first valve being in communication with and controlled by the controller in response to the user selected dispense temperature and user selected dispense volume;

a second controlled temperature water source including a second tank operatively coupled to the controller, a heater for heating water in the second tank to at least 70° F., a second outlet tube communicating with the second controlled temperature water source, and a second valve positioned along the second outlet tube, the second valve being in communication with and controlled by the controller in response to the user selected dispense temperature and user selected dispense volume;

a common passage connecting the first outlet tube and the second outlet tube;

a temperature sensor positioned in proximity to the common passage, the temperature sensor coupled to the controller for providing feedback to the controller for controlling the first and second valves to achieve a user selected dispense temperature;

a mixing valve positioned along the common passage for receiving water flow from each of the first and second outlet tubes, the mixing valve being in communication with and controlled by the controller;

a dispense valve communicating with and controlled by the controller for dispensing water from the mixing valve; and a dispensing tube connected to the common passage and a dispense valve positioned along the dispensing tube, the dispense valve communicating with and controlled by the controller.

* * * * *